J. E. WRIGHT.
CARD SELECTOR.
APPLICATION FILED APR. 25, 1917.
1,287,558.
Patented Dec. 10, 1918.
4 SHEETS—SHEET 1.
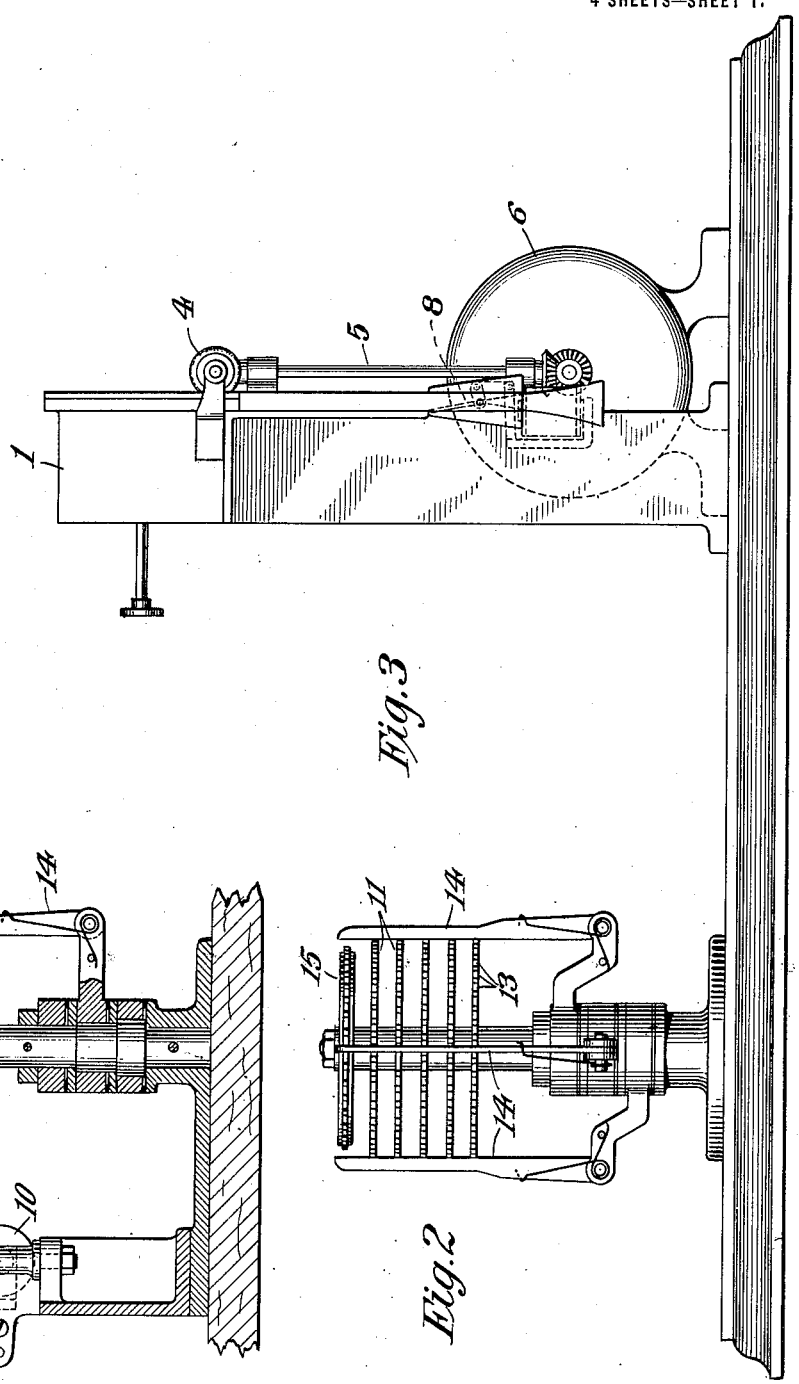

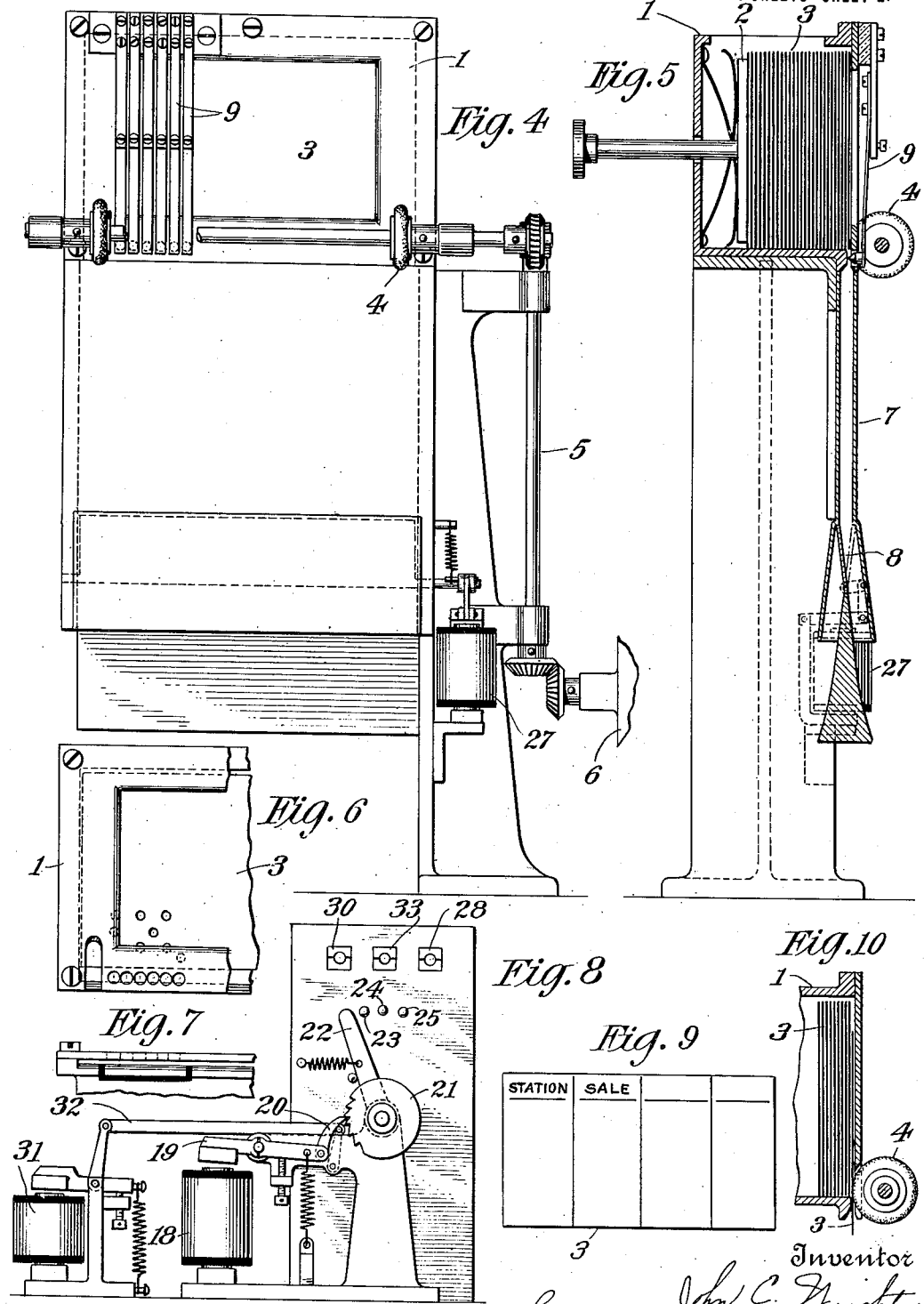

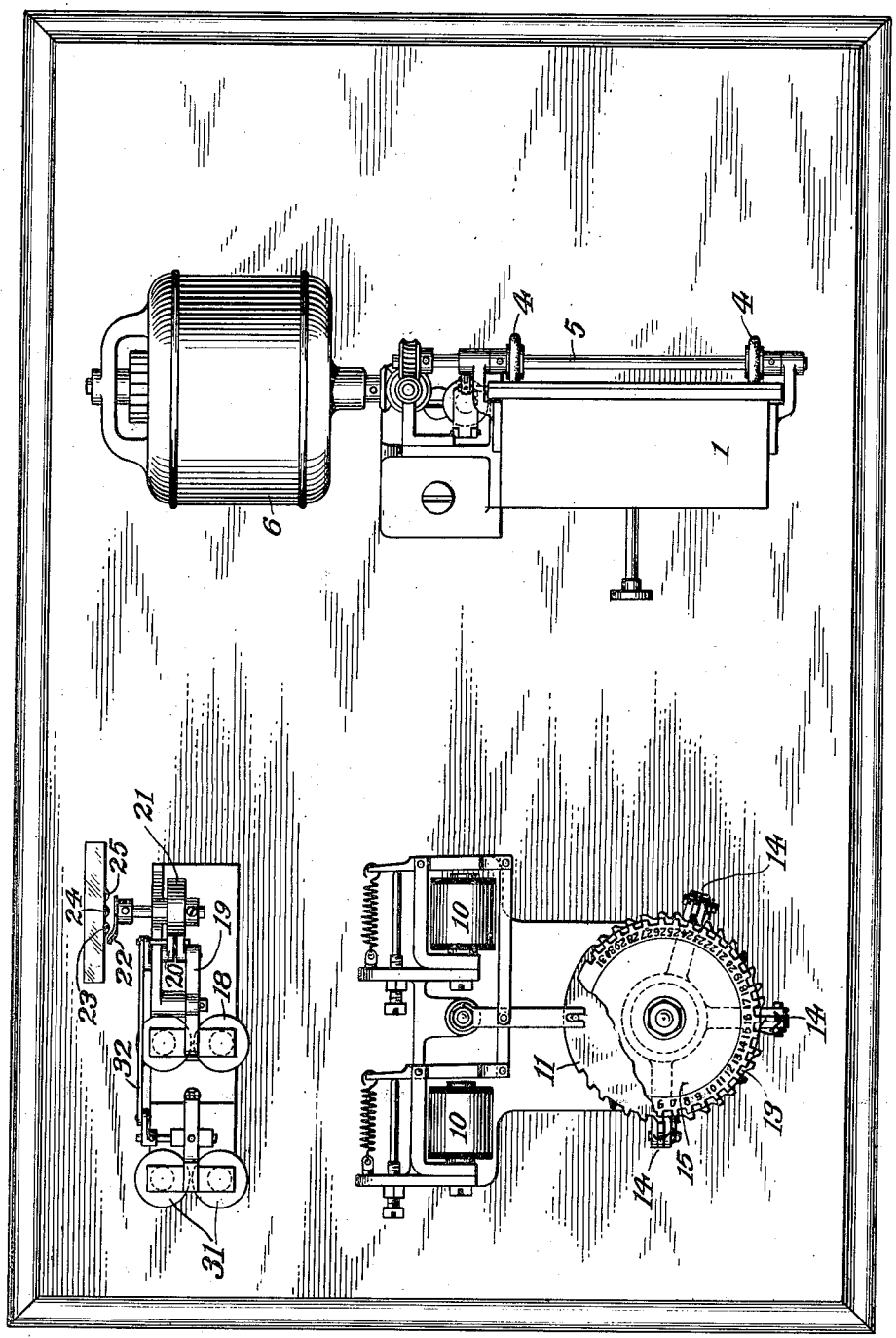

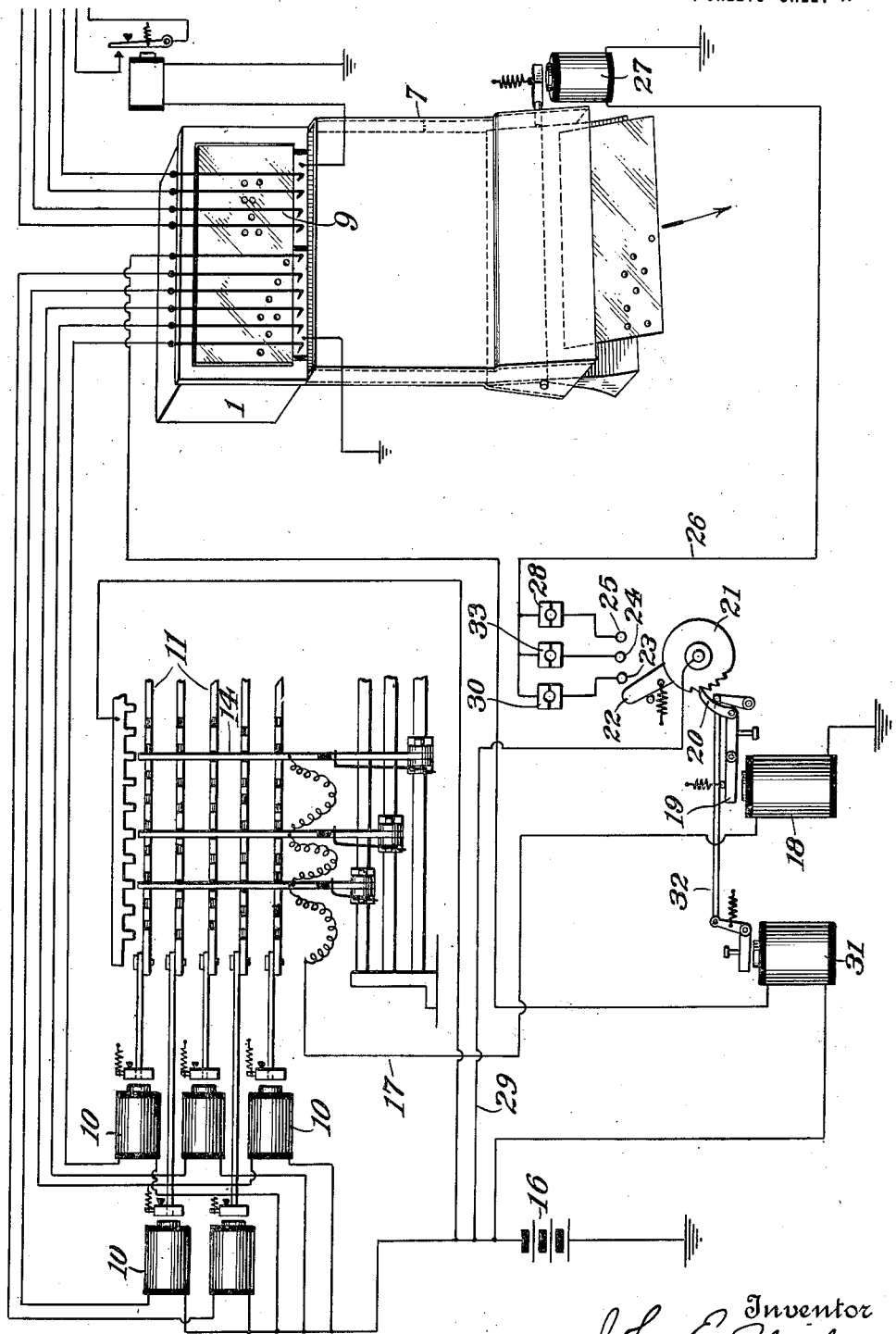

UNITED STATES PATENT OFFICE.

JOHN EDWARD WRIGHT, OF NEW YORK, N. Y.

CARD-SELECTOR.

1,287,558.

Specification of Letters Patent.   Patented Dec. 10, 1918.

Application filed April 25, 1917.   Serial No. 164,582.

*To all whom it may concern:*

Be it known that I, JOHN E. WRIGHT, a citizen of the United States, residing at New York, in the county and State of New York, have invented certain new and useful Improvements in Card-Selectors, of which the following is a full, clear, and exact description.

The invention upon which the present application for Letters Patent is based, pertains to computing systems and is embodied in new and improved means for controlling by means of punched cards or tape, apparatus designed for recording or reproducing the data corresponding to the character or positions of said perforations.

In order that the purpose and hence the nature of the various improvements involved in the practical carrying out of the invention as a whole may be more readily comprehended, a statement, of somewhat general character, of the system may be profitably made. For this purpose, let it be assumed that in a department store, where the character of the operations are such as to make tabulations and computations of the transactions highly important, but their extent is not such as to justify the use of the cumbersome and expensive machines ordinarily used for the purpose, each counter or department be provided with a simple form of perforator by means of which cards or a tape may be readily perforated by a salesman to indicate the amount of each sale.

Assuming that this record has been made on a continuous length of tape, the latter is periodically transferred to the cashier's department, where it is run through a reproducer which is operated by suitable mechanism according to the position of the holes to record the items and totals of the amounts or other data indicated by the punched holes in the tape. Such record may be made upon cards which are preserved as records of sales made over any given counter or any given department.

In case the amounts of sales are punched in cards, these cards will have other perforations punched therein either in advance or at the time of the sales which indicate the department where the sales were made, their date or other necessary information, and these cards may be kept as permanent records or their indications may be totaled by the reproducer. If they are preserved and it becomes necessary at any time or for any purpose to select from a number of them those which contain the records for a certain date or for a certain department, they are run through a selector, which, operated according to the perforations in individual cards, selects and distributes them by a single operation so that all the cards of a certain kind or class may be immediately obtained.

The system may involve numerous other steps, the tape or cards may be punched to afford records of other facts or transactions, and the reproducer may make other and more elaborate records, as will be well understood by those using the system or skilled in the art to which it pertains, but for the purpose of the present case the above outline will serve to show the nature and general purpose of the subject.

From the above it is manifest that the system in its entirety involves virtually the combination or conjoint use of three separate instrumentalities.

First. A perforating machine adapted to selectively punch either cards or tape.

Second. A selecting mechanism in which the operations of a card holder and chute are so controlled as to separate out of a mass the cards of a certain class or character from such as are not wanted, and Third. A reproducer controlled by a perforated card or tape, which actuates suitable mechanism, such as the keys of an adding machine, causing it to reproduce in numerals or letters the totals of any record which corresponds to the holes punched, or other data according to the nature and requirements of the case.

In this application the detailed description of apparatus is that of the mechanism above referred to as the selector, that is, the apparatus which is used, whenever occasion requires, for sorting out from a large number of cards by a single operation all those of a certain kind or class, for example, those which contain the perforated record of all sales of a certain department on a certain date. The claims herein are directed to the novel features of this device, the other elements of the system having been made the subject of other applications.

In the drawings hereto annexed, Figure 1 is a partly sectional view of the permutation disks and accessories of the selector.

Fig. 2 is a side view in elevation of the same.

Fig. 3 is a side elevation of the card chute and its attached parts.

Fig. 4 is a front view of the card holding box with the card selecting contacts and other devices.

Fig. 5 is a vertical section of the chute box and chute.

Fig. 6 is a view of a perforated card passing through the device.

Fig. 7 is a view of the same at right angles to Fig. 6.

Fig. 8 is a view in elevation of the means for controlling the selection of the cards.

Fig. 9 is a representation of a proposed card.

Fig. 10 is a sectional view showing the means of removing the cards from the box.

Fig. 11 is a plan view of the instrument, and

Fig. 12 is a diagrammatic illustration of the apparatus and its mode of operation.

The instrument comprises a card box or holder 1 containing in the rear, Fig. 5, a movable spring actuated plate 2 that tends to force forward a pile of cards 3 that may be placed in it. A pair of friction wheels or disks 4 enter slots in the front side of the card box and bear upon the forward card of a pile therein and being received at relatively slow speed by a counter shaft 5 geared to a motor 6, pull down the cards one at a time and drop them into the chute 7.

For purposes of illustration of the invention, let it be assumed that from a large number of cards only those perforated to indicate the sales made on a given day of a given month in a given department are to be selected, then when such cards reach the lower end of the chute a gate 8 therein will be in a position to direct such cards into a compartment, say to the left of the chute, while for all other cards this gate will be turned to normal position and direct them to the right.

For this purpose each card at, say, the left-hand end, will have certain perforations to indicate the department or station, the month and the day at and on which it was perforated, and as the cards pass from the box 1 they travel under a series of contacts 9, Fig. 4, over the portion of the card perforated to indicate the above data.

Referring to Fig. 12, when a contact 9 comes over a perforation in the card it makes contact with a punched metallic plate or stop and completes a circuit through a corresponding electromagnet 10 and energizes the latter, causing it to attract its spring actuated armature and through the latter to import a rotary movement of predetermined extent to one of a series of disks 11 which returns to its normal position after the magnet is deënergized.

The disks, shown in detail in Figs. 1 and 2, are evenly mounted on a central spindle 12 and each contains a series of notches 13 not in normal vertical lines, but so arranged that when one or more or all of the disks are moved, the notches at one point will be brought into line, thus forming a channel into which one of a series of spring actuated levers 14 pivotedly mounted alongside the spindle may fall.

In the present case I have shown three of these levers 14 and each is adjustable about the spindle, so that it may be set to fall into a channel of notches at any desired point. For example, assume that the cards to be selected are those from department B, then one of the levers 14 will be set in such position that it will fall into a channel of notches which is produced at a given point whence the perforations in a card indicating department B by energizing the magnets 10 will adjust the disks to positions which form this channel at the point to which the lever is adjusted.

In a similar manner, assume that the cards to be selected contain perforations that indicate the twentieth day of the sixth month, then the lever 14 corresponding to the month and that corresponding to the day of the month are so adjusted about the axis of the spindle 12 that they will be in position to drop into the channels of notches which are formed at the points of adjustment when the perforations corresponding to such figures produce the proper adjustment of the disks.

In other words, if the cards to be selected are distinguished by, say three characteristics, the number or letter of a given department, the month and the day of the month on which they were punched, then by simply passing all the cards through the chute, these levers 14 will be permitted to swing through a given arc by the adjustment of the disks 11 according to the number or position of the holes in the cards that correspond to and indicate the three items specified.

When a lever 14 swings into a channel opened for it, it comes in contact with a disk 15 and thus completes a circuit from the battery 16 to the lever 14 and thence by a wire 17 to an electromagnet 18. If two levers 14 are thus moved the magnet 18 will be energized twice, or if all three are moved the magnet will be thrice rendered active.

The magnet 18 operates an armature 19 which on its back stroke operates a pawl 20 and thereby turns a ratchet wheel 21 one step for each energization of the magnet. The ratchet wheel 21 carries a contact arm 22 which by one movement of the wheel comes onto a terminal 23, by two movements onto a terminal 24 and by three movements onto a terminal 25, and these terminals are adapted to be connected by removable switch plugs with a wire 26 which leads to an electromagnet 27 that controls the position of the gate 8 in the card chute.

With this explanation of the apparatus, let it be assumed that all of the cards of a given class are to be selected, then the three levers 14 are properly adjusted and as the cards pass through the chute the ratchet wheel 21 is moved three steps and a plug having been inserted in the jaws 28 a circuit from the battery is closed through wire 29 to magnet 27 and the gate in the card chute is shifted to direct that particular card to the left.

If the cards to be selected have but one distinguishing set of perforations or, for example, if all the cards of a given department, or of a given department for a certain year or month are required, then the plug is inserted in the first or second jaws 30 or 33, as the case may be, so that one or two impulses through magnet 21 will determine which cards are to be directed to the left.

In the group of circuit closing strips 9 there is one, generally that to the right, which does not operate to close the circuit to any of the magnets 10, but is a clearing contact that completes the circuit of a magnet 31 which when energized operates to shift a bar 32 and to thereby withdraw the pawl 20 from the ratchet wheel 21 and permit the latter to turn under the influence of a spring or otherwise in its normal position after it has performed its allotted function of shifting the card gate 8. For this purpose a special hole is punched in each card below the line of those which affect the magnet 10, so that the ratchet wheel 21 will not be returned until all of the other operations have been completed.

Each card, as has been already stated, contains at the right-hand end a series of perforations indicating sales or prices of same, and if so desired a series of contacts may be arranged over them for the operation of tabulating or recording devices. This part of the apparatus is not, however, involved in the present invention.

In the particular form of apparatus herein shown the notches on the disks are so placed that thirty-one channels are obtainable, and it therefore follows that a lever or arm 14 placed opposite a certain desired number will remain inactive until the combination calling for that number is made.

It will be understood that the series of perforations at the left on each card are merely to enable certain cards to be selected, and are not usually punched by the salesman, but by gang punches before the cards are distributed to the several departments. It has furthermore been sufficiently set forth above that cards may be selected by a movement of either one or two or three steps of the ratchet wheel 21 according to which contacts 23, 24 or 25 is connected by a plug with the magnet 27. This is a highly important feature, as it enables three members to be operated selectively by a single operation.

It is manifest that the number of things selected, within certain limits, depends upon the number of the movable arms or bars 14, and that the number of permutations can be increased to any desired extent by the use of additional disks 11. The permutations for selective purposes may consist of five units, as herein shown, which permit of thirty-one combinations, or a sixth unit may be added, which will raise the number of combinations to sixty-three, in which case there would be room for all the letters of the alphabet, all the numerals and twenty-seven spare positions which would afford opportunity for many hundreds of selective combinations and thus meet almost any conceivable condition.

The specific character of the various instrumentalities is obviously a matter of little importance, so far as the general nature of the invention is concerned. For example, instead of using disks, permutation bars or other well known equivalents could be employed, and in other respects the construction could be greatly modified without departure from the invention.

What I claim is:

1. In a selector for perforated cards, the combination with a series of contacts under which the perforated portion of the cards is passed, a series of permutation elements electro-magnetically controlled by the contacts passing over perforations, and levers coöperating with the permutation elements to direct the movements of cards to given points according to the adjustment of the permutation elements.

2. In a selector for perforated cards, the combination with a series of contacts under which the perforated portion of the cards is passed, a series of permutation elements electro-magnetically controlled by the contacts passing over perforations, a plurality of levers coöperating with the permutation elements, means for directing the cards to given points, and means for operating the same by the movement of one or more or all of the said levers, whereby cards having more than one characteristic may be selected by a single operation.

3. In a selector for perforated cards, the combination with permutation elements electro-magnetically controlled by the perforations in the cards, a means controlled by the permutation elements for directing the cards to given points, and a clearing device for resetting the said directing means to normal position before the passage of a card through the apparatus.

4. In a selector for perforated cards, the combination with permutation elements adapted to be set or adjusted to given positions by perforations of given character, levers coöperating with the permutation elements when so set or adjusted, and means for directing the cards to given points operated by the permitted movements of the said levers.

5. In a selector for perforated cards, the combination with a means for directing cards according to the character of the perforations therein, a series of contacts under which the perforated portion of the cards is passed, a series of permutation elements electro-magnetically controlled by the contacts passing over perforations to operate the card directing means according to the adjustment of said elements, and intermediate means for controlling the operation of said directing means adapted to respond to two or more characteristic perforations so as to select by a single operation cards having more than a single characteristic perforation.

In testimony whereof I hereunto affix my signature.

JOHN EDWARD WRIGHT.